United States Patent [19]

Robbins, Jr.

[11] Patent Number: 4,684,107
[45] Date of Patent: * Aug. 4, 1987

[54] COMPOSITE METAL AND PLASTIC FENCE AND BRACKET

[76] Inventor: Edward S. Robbins, Jr., Rte. 7, Box 322, Florence, Ala. 35630

[*] Notice: The portion of the term of this patent subsequent to Aug. 14, 2001 has been disclaimed.

[21] Appl. No.: 643,008

[22] Filed: Aug. 22, 1984

[51] Int. Cl.$^4$ .......................................... E04H 17/12
[52] U.S. Cl. .................-............................ 256/19; 256/13.1; 256/49; 256/52
[58] Field of Search ....................... 256/19, 52, 49, 54, 256/55, 48, 13.1; 403/331, 381

[56] References Cited

U.S. PATENT DOCUMENTS

| | | | |
|---|---|---|---|
| 336,889 | 3/1886 | Burns | 256/52 X |
| 402,666 | 5/1889 | Grant | 256/52 |
| 411,801 | 10/1889 | Fletcher . | |
| 508,687 | 11/1893 | Duggan . | |
| 519,435 | 5/1894 | Schriver . | |
| 736,147 | 8/1903 | Peterson | 256/52 |
| 828,205 | 8/1906 | Glascock . | |
| 853,846 | 5/1907 | Tyler | 256/52 X |
| 894,511 | 7/1908 | Linderman . | |
| 1,720,859 | 7/1929 | Scott | 256/52 |
| 3,065,760 | 11/1962 | Cailas | 403/364 X |
| 3,233,870 | 2/1966 | Gerhardt | 256/13.1 |
| 4,143,859 | 3/1979 | Tews | 256/49 |
| 4,422,348 | 12/1983 | Campbell | 403/344 X |
| 4,465,263 | 8/1984 | Robbins | 256/49 X |
| 4,533,120 | 8/1985 | Ruddock | 256/52 |

FOREIGN PATENT DOCUMENTS

| | | | |
|---|---|---|---|
| 571196 | 12/1957 | Italy | 256/13.1 |
| 779411 | 7/1957 | United Kingdom | 403/331 |

Primary Examiner—Cornelius J. Husar
Assistant Examiner—Joseph A. Fischetti
Attorney, Agent, or Firm—Nixon & Vanderhye

[57] ABSTRACT

A fencing material composed of plastic-ensheathed metal wires and cooperating bracket elements; the fence material has a cross-sectional design including raised bead positions spaced apart by flat web sections; when the fence material is extruded, the bead or rib portions each ensheath a high tensile wire with the surface of the wire being roughened to enhance adhesion with the plastic; the fence material is mounted between fence posts by means of specially designed brackets that enclose the width of the fence material with the interior of the brackets having raised portions to conform to the cross sectional variations in dimensions of the fence material whereby slippage of the fence material whereby slippage of the fence material is prevented while spanning of substantially greater distances between posts and over varying terrain contours is made possible; the brackets have interlocking portions to prevent loss of complimentary bracket pieces in the event the bracket is loosened from a fence post during use.

24 Claims, 15 Drawing Figures

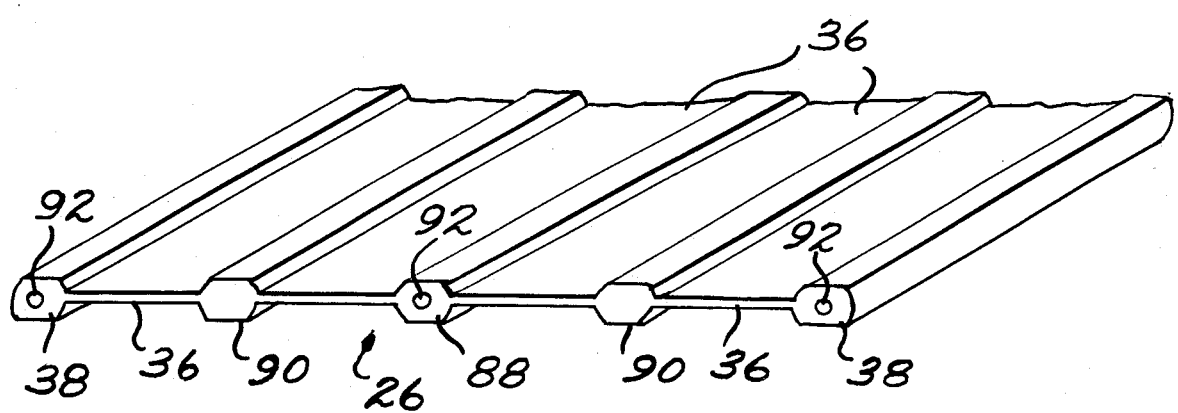
Fig. 7.
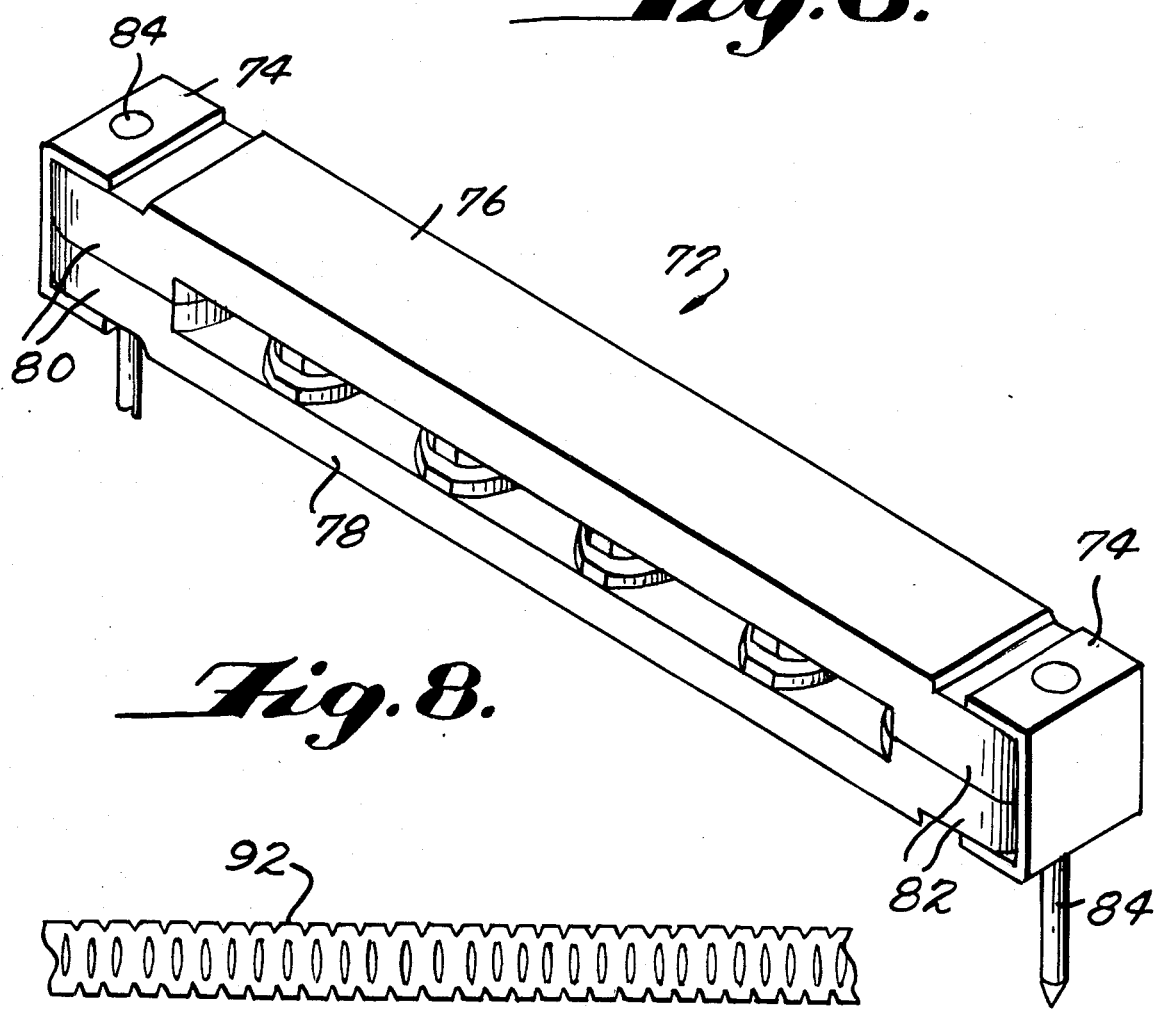
Fig. 6.
Fig. 8.
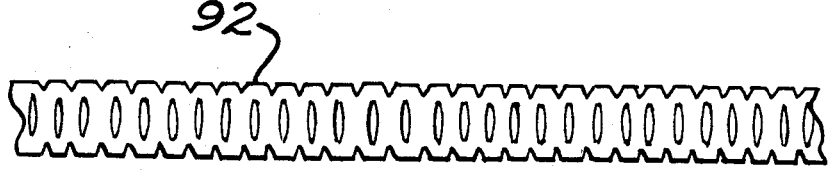

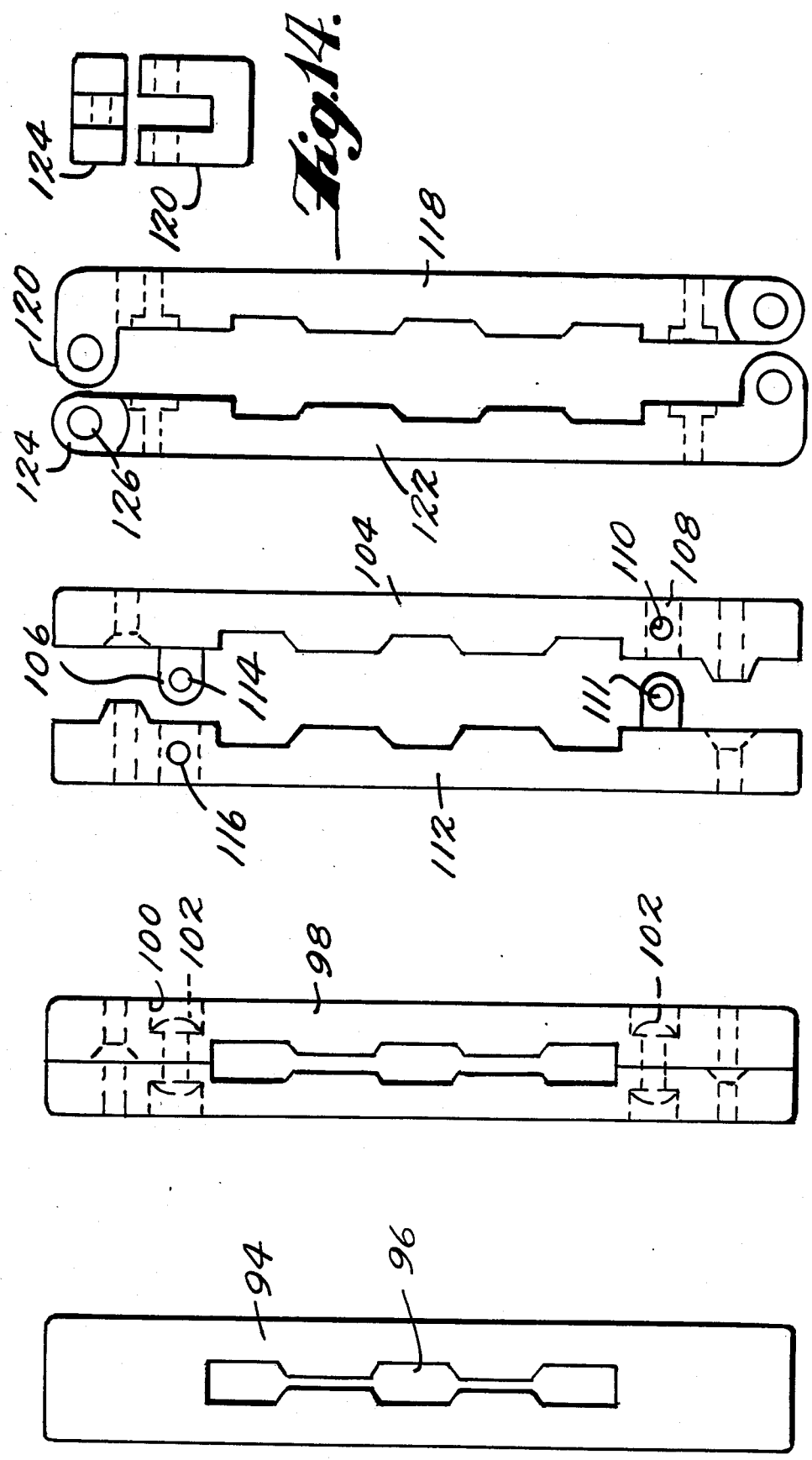

COMPOSITE METAL AND PLASTIC FENCE AND BRACKET

BACKGROUND AND SUMMARY OF THE INVENTION

This invention relates to fencing material and brackets or similar structures, particularly those which are used to confine livestock.

In the past, wooden planks or barbed wire have been widely used to confine livestock such as common farm animals, steers and even thoroughbred race horses.

The fencing material that has been most widely used due to its low cost of installation and upkeep in barbed wire. However, barbed wire suffers from the disadvantage that it can cause painful and unsightly injury to valuable livestock, particularly when the stock becomes agitated or disturbed which frequently happens as during a summer storm or in the event predators penetrate the area in which the live stock are confined. All too frequently, animals in an agitated state are unable to detect the presence of the barbed wire, particularly in poor light conditions and this has often resulted in severe injury to valuable livestock. In addition barbed wire lacks the aesthetic appeal of other types of fence. While other types of fencing material have been employed such as cyclone wire fencing, this is substantially more expensive to install and maintain and can over a period of time result in the same difficulties with respect to damage to livestock as is the case with barbed wire.

In maintaining certain types of livestock, such as thoroughbred race horses, or animals of similar value, entirely wooden fences have been employed which, while pleasing to the eye and relatively safe to the animal, are expensive to install and maintain.

In confronting the foregoing difficulties, the prior art has resorted to the use of metals and plastic to form fencing material such as that disclosed in U.S. Pat. No. 3,877,140 and such fencing material would appear to satisfy many needs for the livestock industry where no particular strength or great spans of area need to be enclosed.

The present invention is an improvement on the fencing construction and bracket of U.S. application Ser. No. 443,885, filed Nov. 23, 1982, now U.S. Pat. No. 4,465,263 the disclosure of which is hereby incorporated by reference. That application discloses an improved fencing material and bracket which has been very successful in reducing installation and maintenance costs as well as preventing injury to livestock in corrals enclosed by such fencing material.

The present invention relates to an improvement in the bracket structure and cross-sectional shape of the fencing material which enable installation of the fencing material to be effected more rapidly where the bracket of the present invention is employed and also loss of the bracket elements will be prevented in the event that an individual bracket or brackets become separated from a fence post on which they were initially installed.

In addition, the fence bracket of the present invention is formed with recess surfaces having raised portions which are rounded in shape, both transversely and longitudinally of the bracket to minimize wear on the fencing material such as will occur when animals repeatedly come into contact with the fencing material and which will also permit suspending the fencing material over uneven terrain without imposing undue strains on the fencing material or the brackets themselves while maintaining the pleasing and orderly appearance of the plastic fencing material.

In a preferred embodiment, the bracket of the present invention will comprise two members which, at either end, are provided with interlocking means so that when the bracket is installed on a fence post with the fence material disposed between the two bracket elements as in the aforesaid application, the bracket elements will be interlocked so that in the event the bracket becomes loose or dislodged from a fence after a period of use, the individual bracket elements will remain secured together on the plastic fence material. Thus, a worker need merely periodically inspect the fence and where a bracket has become displaced or loosened, he need merely renail or screw the interlocked brackets again to the fence post. Thus, the necessity of replacing a lost bracket element will be eliminated which can be very troublesome in a livestock environment or in a grassy environment such as for horses where mowers periodically are employed to cut the grass.

In addition, a new form of roller bracket for corner installations is provided which, as in the previous application, mentioned above, will eliminate the necessity of using fasteners directly through the plastic fencing material and which will accurately guide a length of fencing material around a corner of a fenced enclosure without distorting the plastic fencing material and thus detracting from the overall appearance of the fencing.

BRIEF DESCRIPTION OF THE DRAWINGS

The foregoing and other advantages will become apparent as consideration is given to the following detailed description taken in conjunction with the drawings, in which

FIG. 6 is a perspective view of an alternate embodiment of the fence bracket of the present invention;

FIG. 7 is a perspective view of a section of the improved fencing material of the present invention;

FIG. 8 is a greatly enlarged detailed view in elevation of the high tensile wire that is embedded in the plastic fencing material;

FIGS. 10-14 are views of other embodiments of this invention.

DETAILED DESCRIPTION OF THE INVENTION

Figure 1:
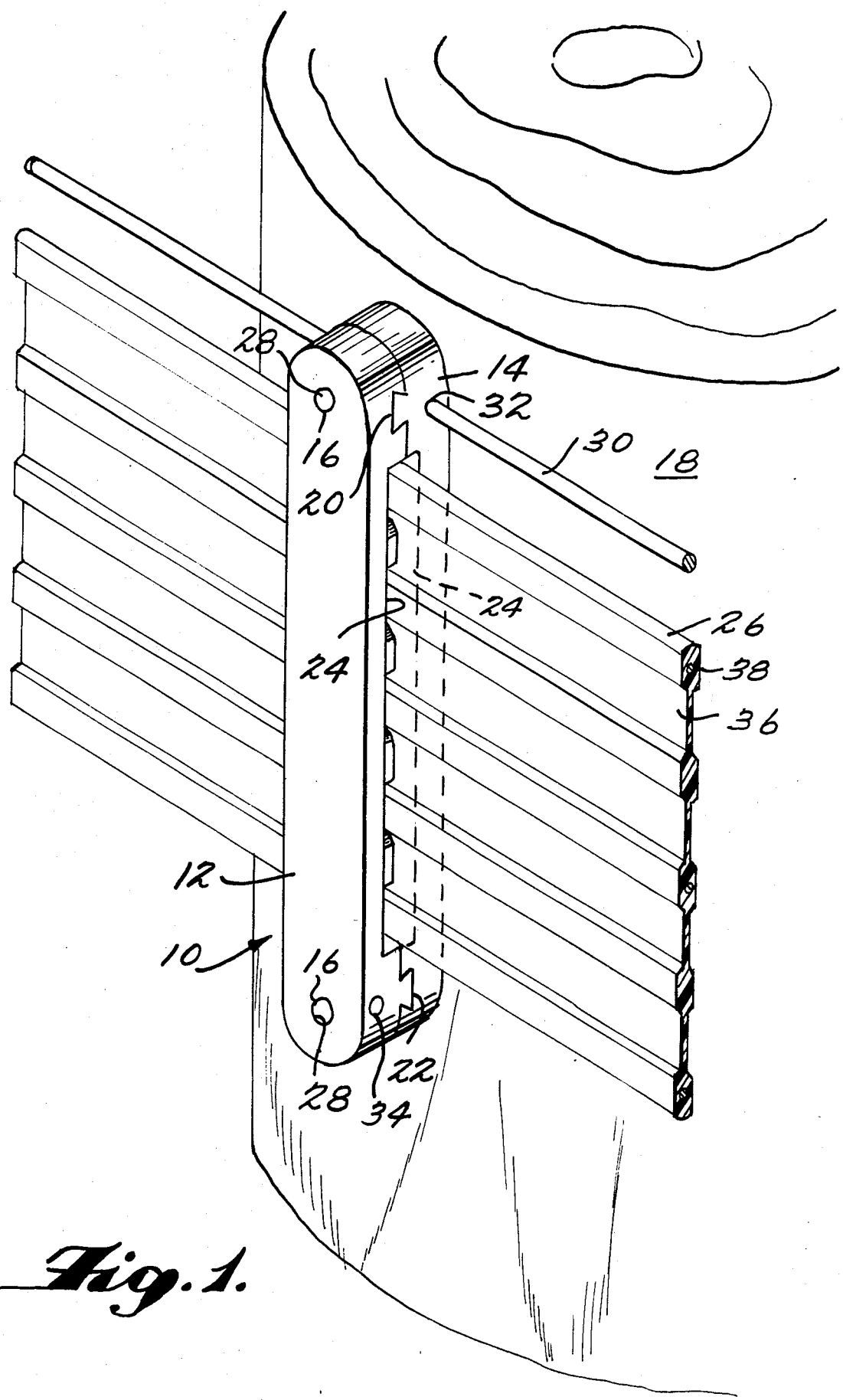
FIG. 1 is a perspective view of an improved bracket element and fencing material of the present invention.

Referring now to the drawings wherein like numerals designate corresponding parts throughout the several views, there is shown in FIG. 1 one form of the fence bracket 10 of the present invention. The bracket 10 is formed with two identical bracket elements 12 and 14, each of which has at each end an opening 16 for receiving a fastening nail to secure the elements to a fence post. On the inner face of each of the ends of the bracket elements 12 and 14, a dove-tailed joint is provided in the form of a sloped wall channel 20 at one end and a complimentary tongue 22 at the opposite end. Thus, the tongue 22 of one of the bracket elements will fit into the channel 20 of the other bracket element, as illustrated. With this arrangement, separation of the bracket elements 12 and 24 will be prevented in the event the bracket 10 becomes separated from the fence post 18.

Each of the bracket elements 12 and 14 are formed with an elongated recess 24, which will be described in more detail below. With one of the brackets such as 14 manually held against the fence post 18, a worker places the fencing material 26 in the recess 24 of the bracket element 14 and then slides the dove tailed sections of bracket element 12 onto the corresponding elements of bracket 14 and then inserts a nail or other fastening element 28 through the apertures 16 to secure the bracket to the fence post 10. With this arrangement, as described in the above identified U.S. Pat. No. 4,465,263 the fence material 26 will be maintained in a vertical orientation and will serve as a protective barrier for livestock. Obviously, several lengths of material with corresponding brackets may be disposed vertically spaced along a set of posts. If desired, a low voltage conductive wire 30 may be passed through an aperture 32 or 34 provided in each of the bracket elements to discourage undue contact by livestock with the fencing material. If the bracket were made of metal an insulator would be needed to isolate the bracket from the current carried by the wire.

Figure 2A:
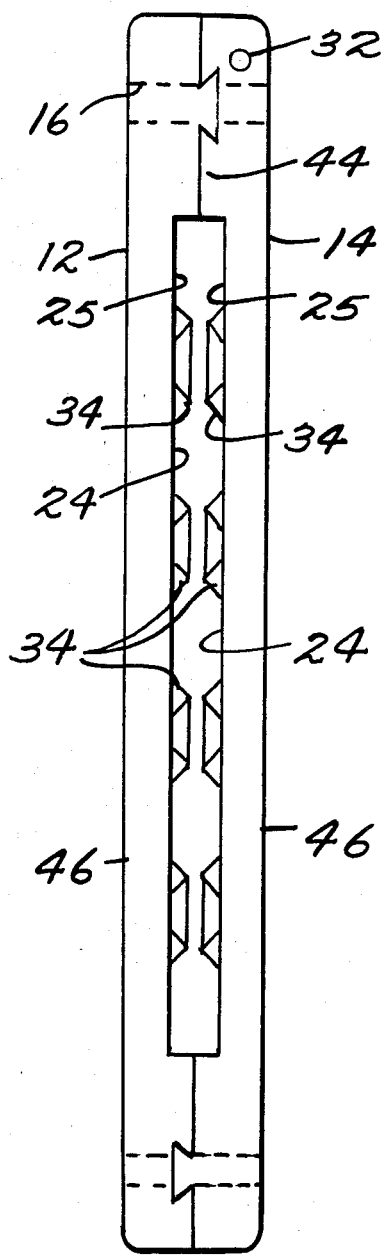
FIG. 2A is a side view in elevation of the bracket of FIG. 1.
Figure 2B:
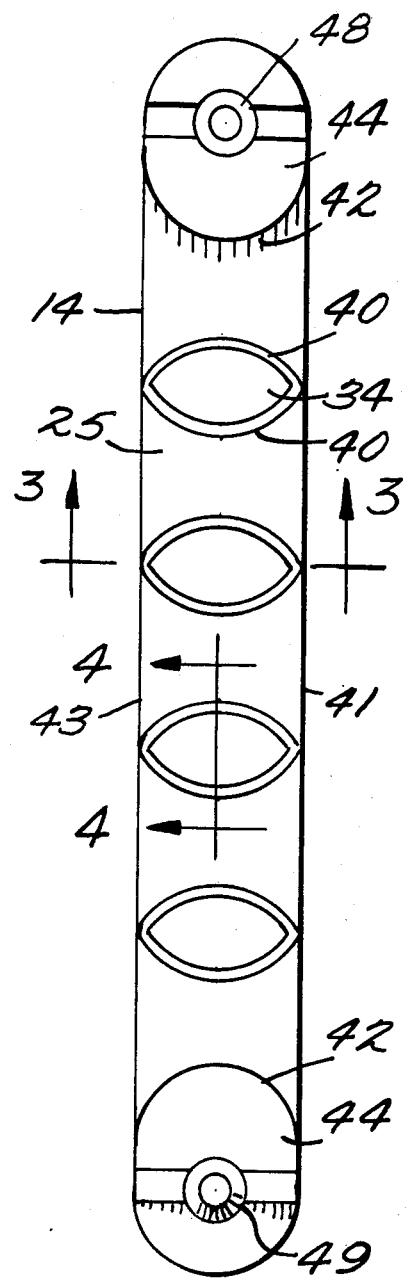
FIG. 2B is a front view in elevation of one of the bracket elements of the bracket of FIG. 2A.

Turning now to FIGS. 2A and 2B, it will be seen that the interior surface 25 of each recess 24 is provided with a plurality of raised surface portions 34.

The raised surface portions 34 extend above the flat surface 25 of each recess 24 to a heighth such that the space between a facing raised surface 34 on the opposite bracket element 14 will be only slightly larger than the thickness of the web portion 36 of the fencing material 26. Similarly, the brackets are formed so that the flat surfaces 25 above and below each raised surface 34 is of a dimension only slightly larger than the enlarged beads 38 formed on the fencing material 26. With this arrangement, any slippage of the fencing material, in the event a vertical load is imparted to the fence will be ineffective to cause buckling of the fence within a bracket even if a bracket becomes loose from its post due to the use of the interlocking means. In other words, the clearances between the elements in the recesses 24 are critically determined to prevent any slippage in the event weight is imparted to the plastic fencing. As is apparent, however, the spacing of the bracket elements enables the fencing material to slide sideways through the bracket in response to longitudinal forces.

With reference to FIG. 2B, the raised surfaces 34 will be seen to have rounded or smooth sloping edges or walls 40 on their upper and lower surfaces so that the fencing material and particularly the beads will not come into contact with any sharp corners when installed in the bracket 10. Since any movement of the fence material will be parallel to the surface 25, it is important for walls 40 curve in the manner of an arch from side 41 to side 43 of each bracket element. Thus, undue abrasion or tearing of the plastic material of the fencing 26 is eliminated. Similarly, the upper and lower surfaces 42 of the raised end portions 44 of each bracket element are also smoothly curved for the same reason.

Figure 3:
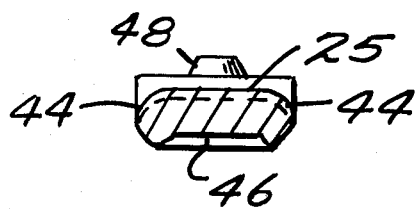
FIG. 3 is a view along lines 3—3 of FIG. 2B.

As shown in FIG. 3, the flat surfaces 25 are also provided with rounded edges 44 to forestall any undue wear on the plastic fencing material 26. Also shown in FIG. 3, the outside surface 46 of the bracket elements 12 and 14 are formed with a shallow radius to facilitate mounting of the back surface 46 of each bracket element on a circular fence post. The inner faces of the enlarged ends 44 are formed either with a partially conical raised projection 48 or a complimentary partially conical recess 49 to assist in maintaining the fastener member hole 16 in alignment as a nail is driven through the respective bracket elements.

Figure 4:
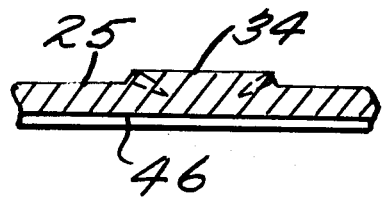
FIG. 4 is a view along lines 4—4 of FIG. 2B.

As shown in FIG. 4, the raised surfaces 34 need only slightly protrude above the flat web accomodating surfaces 25 of each bracket element.

Figure 5:
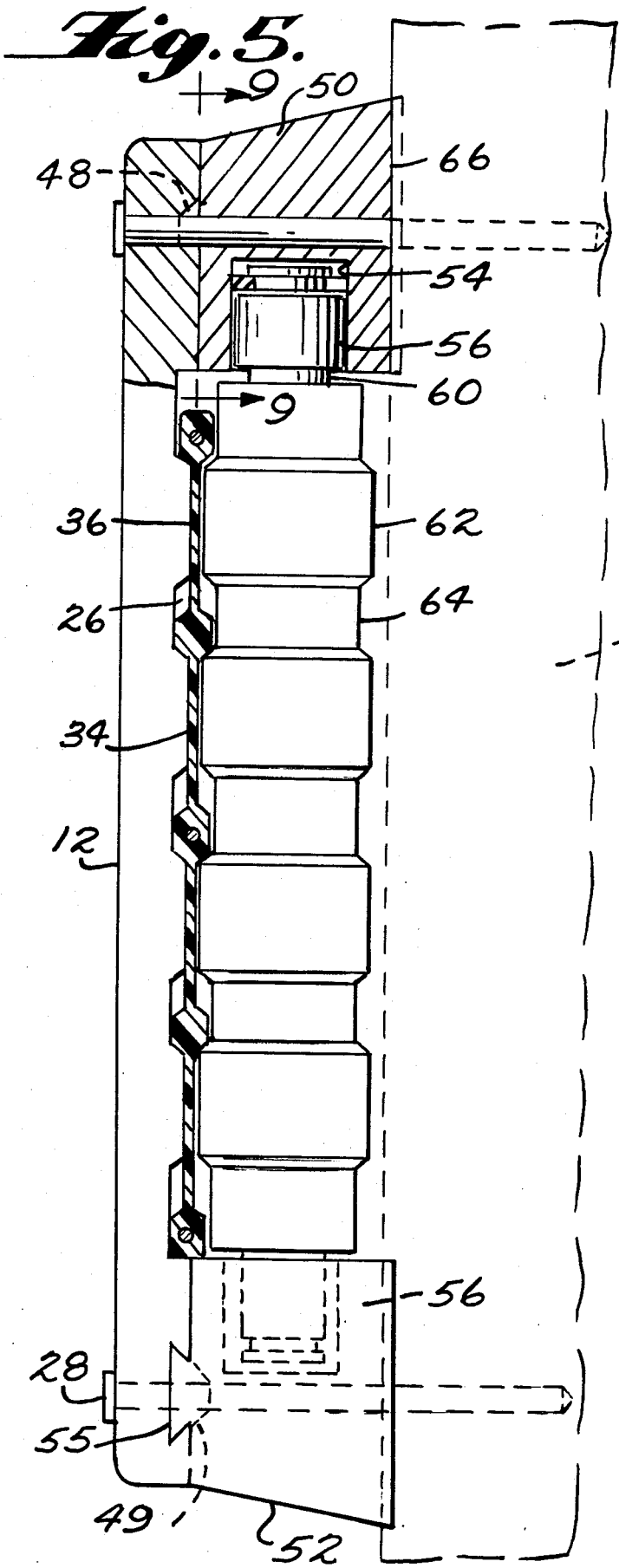
FIG. 5 is a side view in elevation, partly in section of the improved roller bracket of the present invention.
Figure 9:
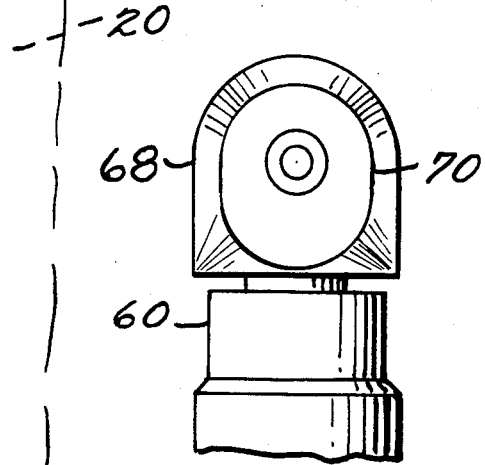
FIG. 9 is a view along lines 9—9 of FIG. 5.

With reference now to FIG. 5, there is shown a corner roller bracket of the present invention. According to the present invention, either bracket element 12 or 14 of FIGS. 1 through 4 may be employed as the outer bracket element in the roller bracket assembly of FIG. 5, thus resulting in a significant manufacturing cost saving due to the interchangeability of these elements. The inner roller bracket member is very similar to the function of the corresponding element disclosed in U.S. Pat. No. 4,465,263 and only the differences will be described below. In FIG. 5, the inner roller bracket assembly includes upper head member 50 and an similarity formed lower head member 52. The head members may be formed with the dove-tail joint as at 55. As shown in the upper portion of FIG. 5, the upper head member 50 has a central cylindrical recess 54 which houses a bearing assembly 56 which receives one end of a roller shaft 60. The roller shaft 60 is integrally formed from end to end and includes a series of alternately raised portion 62 and recesses 64 so as to conform tangentially to the cross-sectional configuration of the fencing material 26, as shown. Each of the head members 50 and 52 has a slight radius on its rear face 66 to enable a user to securely mount these faces on a fence post indicated in broken lines at 20. Also, as shown in FIG. 9, the rear face 66 is greatly enlarged as indicated at 68 relative to the front face 70 to thus impart great stability to the roller bracket assembly. The close tolerances in terms of the clearances between the raised surfaces 36 and enlarged radius roller 62 ensure accurate positioning and maintaining of the fencing material 26 in a stable condition in the roller bracket assembly. As mentioned in the above-noted application, the roller bracket assemblies permit a user to wrap the fencing material about a corner by using several posts as opposed to a single post with the rotatable shaft 60 enabling the user to feed the fencing material 26 about the roller brackets in installing the fencing material. Further, when a weight is imparted to another portion of the fence at a distance from a corner of a fenced in enclosure, the roller brackets will facilitate moving or sliding of the fencing material 26 around the corners to forestall loosening of the posts or damage to the roller brackets. A typical installation for such roller brackets is illustrated in the aforementioned U.S. Pat. No. 4,465,263, the disclosure of which is in corporated herein by reference and relied upon.

Referring now to FIG. 6, there is illustrated an alternate embodiment of the fence bracket of the present invention. The embodiment illustrated in FIG. 6 differs from the embodiment of FIGS. 1-4 in that the bracket 72 employs two U-shaped clamp members 74, located at each end of the bracket 72 to retain the bracket elements 76 and 78 in the illustrated assembled position. Each of the ends 80 and 82 of the bracket elements 76 and 78 are provided with through bores for receiving a fastening member such as a nail 84. It will be understood, of course, that the through bores at the end of the bracket elements may be threaded and that the fastening element 84 may be in the form of a threaded screw to hold the bracket elements in the assembled condition on a fence post.

Referring now to FIG. 7, there is shown a perspective view of the plastic fencing material 26 of the present invention which is specifically shaped to cooperate with the brackets 10, 62 and 72 of the present invention. As shown, the outer parallel edges are formed with enlarged beads or ribs 38 and a central portion 88 is also in the form of an identically shaped enlarged bead. Each of the beads 38 and 88 ensheath a high tensile wire 92 in the same manner as in the above mentioned U.S. Pat. No. 4,465,263. The wires 92 in each of the ribs 38 and 88 differs in that its exterior surface is roughened as illustrated in FIG. 8. As shown, the surface of the wire 92 has a series of notches formed therein which will improve adhesion between the plastic material of the fence and the embedded wires. The wire has a galvanized coating to resist corrosion.

Between the ribs 88 and 86, in the illustrated embodiment of FIG. 7, additional beads 90 are located spaced by the flat webs 36 from the adjacent wire carrying ribs 86 and 88. It will be noted that the surfaces of each of the beads 38, 88 and 90 are all smoothly shaped to closely interfit with the recess between the bracket elements are indicated in FIG. 5.

It will be appreciated that the surfaces provided on the brackets which come into contact with the fence are contoured to eliminate or at least minimize abrasion to the fence as it is allowed to float through the brackets during installation and tensioning and as a result of movement due to changes in temperature or in the event of contact by livestock. In addition, incorporation of the unreinforced beads 90 minimizes the possibility of wrinkling of the fence transverse to its longitudinal axis under all types of weather, temperature and terrain conditions.

The fence may be extruded from polyvinyl chloride with presently available extruding techniques. The resulting product should be constituted to have a durometer range of between 90-94 Shore A although other materials and hardnesses may be employed. The brackets themselves may be coated with paint to resist corrosion and improve lubricity and appearance.

Turning now to FIGS. 10-14, in FIG. 10 there is shown another embodiment where the bracket means of the present invention is in the form of a single piece 94 having the slot-like opening 96 for the fence material. The bracket 94 may be cast in a mold which will form the opening 96.

In FIG. 11, another embodiment of the bracket is shown at 98 which differs from the embodiment of FIGS. 1-8 in that the bracket members are formed with rivet openings 100 in which rivets 102 are secured to permanently hold the bracket elements in the assembled relation. In FIG. 12, one of the bracket elements 104 is provided with an apertured tongue 106 at one end thereof and a through bore 108 at the other end with the bracket having a bore 110 formed therein. The corresponding elements are provided in the opposing bracket element 112 so that when the two bracket elements are assembled, a threaded screw or rivet may be inserted through the bores 114 and 116 at the upper end of the bracket and 110 and 111 at the lower end thereof to hold the bracket in its assembled relation. In FIG. 13, the upper end of the bracket 118 is provided with a bifurcated head having apertured tongues 120 which are more clearly shown in FIG. 14. The corresponding end of the cooperating bracket element 122 is provided with an extension 124 having an alignable bore 126. At the opposite end of the respective bracket elements 118, 122, these features are reversed to simply the manufacturing involved. As with the previous embodiments, threaded screws or rivets may be inserted through the aligned bores in the head 120 and extension 124.

Having described the invention, it will be apparent to those skilled in this art that various modifications may be made thereto without departing from the spirit and scope of this invention as defined in the appended claims.

What is claimed is:

1. A fence comprising, in combination, an elongated web of plastic material having spaced substantially parallel edges along its length, each edge having a bead, a high tensile wire embedded in each bead along the length of said material, a substantially flat portion extending between said beads, a plurality of support bracket means each having means for attachment to a post, each bracket means having a first and a second bracket element each including a face with said face of each element having recess means for receiving a portion of said edges of said elongated web, the dimensions of said recess means, when said bracket elements are joined together being such that when a load is applied to said elongated web, the surfaces of said recess means will prevent said edges of said web from moving out of said recess while allowing said web to slide in a longitudinal direction.

2. The fence as claimed in claim 1, wherein a third wire is provided intermediate said spaced edges and is embedded in a third bead located intermediate said spaced edges, with said third wire and bead extending parallel to said spaced edges, said bracket elements having recess means for receiving said third bead.

3. The fence as claimed in claim 1, wherein said bracket elements each have an inner face and an outer face, said inner face including said recess means with said recess means extending along the length of each said bracket element, said recess means of each bracket element having an interior surface having raised portions spaced there along, each said raised portion having smoothly contoured walls which rise at an angle from the surface of said recess means.

4. The fence as claimed in claim 3, wherein said raised surfaces in said recess means have a height such that when said bracket elements are joined together, a predetermined space will be provided between opposing raised surface portions.

5. The fence as claimed in claim 1, wherein said bracket means including means for locking said bracket elements together independent of said means for attachment to a post.

6. The fence as claimed in claim 5, wherein said bracket elements each have opposite ends and said locking means includes clamp members for engaging and juxtaposed ends of said bracket elements when said bracket elements are joined together, said clamp having an aperture and said ends of said bracket elements having aligned apertures for receiving a fastening member through said apertures of said clamp and said apertures in said bracket elements.

7. The fence as claimed in claim 5, wherein said interlocking means are a pair of dovetailed joints, one located at one end of said bracket elements and the other located at the opposite end of said bracket elements.

8. A bracket member for use with the fence of claim 1, wherein said bracket member has a first bracket element having spaced notches and a roller bracket element comprising an elongated roller rotatably mounted between spaced support members, said roller having circumferential grooves for accommodating each said bead and spaced enlarged radial portions for accommodating said flat portion.

9. The bracket member as claimed in claim 8, wherein said spaced support members have means for interlocking engagement with the ends of said first bracket element.

10. The bracket as claimed in claim 9, wherein said interlocking means are dove-tail joints.

11. The bracket member as claimed in claim 8, wherein said support elements include cylindrical recesses and have bearing means disposed in said recesses for rotatably supporting an end of said roller.

12. The fence as claimed in claim 1, wherein each said bracket elements is provided with a protective coating.

13. The bracket member as claimed in claim 8, wherein said first and said roller bracket elements are provided with a protective coating.

14. The bracket member as claimed in claim 8, wherein said support elements have fence engaging surfaces and said fence engaging surfaces are inwardly curved to conform to the surface of a circular fence post.

15. The fence as claimed in claim 1, wherein each said bracket element, adjacent their respective ends, are provided with rivet openings for receiving rivets for fastening the bracket elements together.

16. The fence as claimed in claim 1, wherein each bracket element has at one end thereof a protruding tongue having an aperture therein and adjacent the other end thereof, a bore extending transverse to said face with said bore having a transverse aperture therethrough intermediate its ends.

17. The fence as claimed in claim 1, wherein each bracket element has at one end thereof a bifurcated head with a portion of each head extending transverse to said face said bifurcated head having two arms with each arm having a transverse bore therethrough said bores being alignable with each other, the opposite end of each said bracket element having a projection extending centrally from the end of said bracket element said extension having a bore extending transversely therethrough.

18. A fence as claimed in claim 1, further comprising at least one elongated low voltage conductive wire and means for retaining said conductive wire in an operative relationship relative to said elongated web.

19. A fence comprising, in combination, an elongated web of plastic material having spaced substantially parallel edges along its length, each edge having a bead, a high tensile wire embedded in each bead along the length of said material, a substantially flat portion extending between said beads, a plurality of support bracket means each having means for attachment to a post, each said bracket means having a central opening including two oppositely facing surface portions with each said surface portion having recess means for receiving a portion of said edges of said elongated web, the dimensions of said recess means being such that when a load is applied to said elongated web, the surfaces of said recess means will prevent said edges of said web from moving out of said recesses while allowing said web to slide in a longitudinal direction.

20. A fence as claimed in claim 19, further comprising at least one elongated low voltage conductive wire and means for retaining said conductive wire in an operative relationship relative to said elongated web.

21. A fence comprising, in combination, an elongated web of plastic material having spaced substantially parallel edges along its length, each edge having a bead, a high tensile wire embedded in each bead along the length of said material, a substantially flat portion extending between said beads, a plurality of support bracket means each having means for attachment to a post, each bracket means having a first and a second bracket element each including a face with said face of each element having recess means for receiving a portion of said edges of said elongated web, the dimensions of said recess means, when said bracket elements are joined together being such that when a load is applied to said elongated web, the surfaces of said recess means will prevent said edges of said web form moving out of said recess, said bracket means having means for locking said bracket elements together independent of said means for attachment to a post, said bracket elements each having an inner face and an outer face, said inner face including said recess means with said recess means extending along the length of each said bracket element, said recess means of each bracket element having an interior surface having raised portions spaced therealong, each said raised portion having smoothly contoured walls which rise at an angle from the surface of said recess means, each said bracket element having opposite edges and said raised surface portions extending from one edge to the opposite edge, said raised surface portions each having a first and second side wall, each of which curves along an arch from said one side edge to the opposite side edge of each said bracket element.

22. A fence as claimed in claim 21, further comprising at least one elongated low voltage conductive wire and means for retaining said conductive wire in an operative relationship relative to said elongated web.

23. A fence comprising, in combination, an elongated web of plastic material having spaced substantially parallel edges along its length and a substantially flat web portion, each edge having an enlarged cross-section relative to said flat web portion and encasing a high tensile wire, a plurality of support bracket means for mounting on spaced fence posts, at least some of said bracket means each having a face with recess means for receiving a portion of said spaced edges and said web, the dimensions of said recess means being such that when said web is mounted on a fence post by a said bracket means, and when a load is applied to said elongated web, the surfaces of said recess means will prevent said edges of said web from moving out of recess means while allowing said web to slide in a longitudinal direction, said bracket means having means for attaching said bracket means to a fence post.

24. A fence as claimed in claim 23, further comprising at least one elongated low voltage conductive wire and means for retaining said conductive wire in an operative relationship relative to said elongated web.

* * * * *